US011836519B2

(12) United States Patent
Klein

(10) Patent No.: US 11,836,519 B2
(45) Date of Patent: Dec. 5, 2023

(54) DECOUPLED PUSH-DOWN EXECUTION GENERATOR

(71) Applicant: Oracle International Corporation, Redwood Shores, CA (US)

(72) Inventor: Frank Joseph Klein, Eagan, MN (US)

(73) Assignee: Oracle International Corporation, Redwood Shores, CA (US)

( * ) Notice: Subject to any disclaimer, the term of this patent is extended or adjusted under 35 U.S.C. 154(b) by 815 days.

(21) Appl. No.: 16/657,532

(22) Filed: Oct. 18, 2019

(65) Prior Publication Data

US 2020/0125404 A1 Apr. 23, 2020

Related U.S. Application Data

(60) Provisional application No. 62/748,347, filed on Oct. 19, 2018.

(51) Int. Cl.
*G06F 9/48* (2006.01)
*G06F 8/30* (2018.01)
*G06F 9/54* (2006.01)
*G06F 16/27* (2019.01)

(52) U.S. Cl.
CPC .............. *G06F 9/4881* (2013.01); *G06F 8/30* (2013.01); *G06F 9/54* (2013.01); *G06F 16/27* (2019.01)

(58) Field of Classification Search
None
See application file for complete search history.

(56) References Cited

U.S. PATENT DOCUMENTS

| 7,152,070 | B1* | 12/2006 | Musick | ................. | G06F 16/254 |
| | | | | | 707/999.102 |
| 2005/0262194 | A1* | 11/2005 | Mamou | ................. | G06F 16/254 |
| | | | | | 709/203 |
| 2018/0173502 | A1* | 6/2018 | Biskup | .................... | G06F 21/56 |
| 2018/0173715 | A1* | 6/2018 | Dunne | .................. | G06F 16/958 |
| 2018/0181632 | A1* | 6/2018 | Zarum | .................... | G06F 16/83 |

* cited by examiner

*Primary Examiner* — Lewis A Bullock, Jr.
*Assistant Examiner* — Melissa A Headly
(74) *Attorney, Agent, or Firm* — Kilpatrick Townsend & Stockton LLP

(57) ABSTRACT

A method of marshalling existing software applications to automatically execute a task in a cloud environment includes generating actions that together execute the task; passing the actions to code generation services, where each of the code generation services is associated with a corresponding software application. Each of the code generation services is configured to select a subset of the actions that can be executed by the corresponding software application, and to generate second actions to be executed by the corresponding software application that implement the subset of the actions. The method also includes providing a job definition for the task including each of the second actions for each of the software applications.

15 Claims, 13 Drawing Sheets ing centers included database hardware and software, servers, processing centers, and any other computing systems that may be used to store and/or process customer data.

DECOUPLED PUSH-DOWN EXECUTION GENERATOR

CROSS-REFERENCE TO RELATED APPLICATION

The present application is a non-provisional application of, and claims the benefit and priority under 35 U.S.C. 119(e) of U.S. Provisional Application No. 62/748,347, filed Oct. 19, 2018, entitled "DECOUPLED PUSH-DOWN EXECUTION GENERATOR". The entire contents of the aforementioned applications are incorporated herein by reference for all purposes.

BACKGROUND

In the previous generation of computing architectures, processes were executed using on-premise computing centers with standalone applications that were installed on computing devices at a customer's site. Resources were not shared between customers, and applications were designed to be downloaded, installed, and accessed through a user interface. These un-premise computing centers included database hardware and software, servers, processing centers, and any other computing systems that may be used to store and/or process customer data.

The current generation of computing architectures instead relies heavily on a cloud environment. Cloud computing represents available computer system resources that are not directly or actively managed by the customer. This may include both data storage and processing systems. Cloud environments may share computing resources between many different customers, and the computing resources may be accessed through a web interface using a network connection. Instead of transferring computer resources to a customer, a cloud provider instead owns the computing resources and provides the infrastructure and services provided by the cloud environment for customer use.

While many of the existing applications and software functions from the traditional on-premise architecture have moved to the web, some software applications were designed in such a way that migration to the cloud environment is not easily accomplished. However, these existing legacy software applications may provide functions that continue to be very useful, even for cloud environments.

SUMMARY

In some embodiments, a method of marshalling existing software applications to automatically execute a task in a cloud environment may include receiving a request to execute a task in the cloud environment; generating a plurality of actions that together execute the task; and passing the plurality of actions to a plurality of code generation services. Each of the plurality of code generation services may be associated with a corresponding software application. Each of the plurality of code generation services may be configured to select a subset of the plurality of actions that can be executed by the corresponding software application, and to generate a second plurality of actions to be executed by the corresponding software application that implement the subset of the plurality of actions. The method may also include providing a job definition for the task. The job definition may include each of the second plurality of actions for each of the software applications.

In some embodiments, a non-transitory computer-readable medium may include instructions that, when executed by one or more processors, cause the one or more processors to perform operations including receiving a request to execute a task in a cloud environment; generating a plurality of actions that together execute the task; and passing the plurality of actions to a plurality of code generation services. Each of the plurality of code generation services may be associated with a corresponding software application. Each of the plurality of code generation services may be configured to select a subset of the plurality of actions that can be executed by the corresponding software application; and to generate a second plurality of actions to be executed by the corresponding software application that implement the subset of the plurality of actions. The operations may also include providing a job definition for the task, wherein the job definition comprises each of the second plurality of actions for each of the software applications.

In some embodiments, a system may include one or more processors and one or more memory devices. The one or more memory devices may include instructions that, when executed by the one or more processors, cause the one or more processors to perform operations including receiving a request to execute a task in a cloud environment; generating a plurality of actions that together execute the task; and passing the plurality of actions to a plurality of code generation services. Each of the plurality of code generation services may be associated with a corresponding software application. Each of the plurality of code generation services may be configured to select a subset of the plurality of actions that can be executed by the corresponding software application; and to generate a second plurality of actions to be executed by the corresponding software application that implement the subset of the plurality of actions. The operations may also include providing a job definition for the task, wherein the job definition comprises each of the second plurality of actions for each of the software applications.

In any embodiments, any of the following features may be implemented in any combination and without limitation. The method/operations may also include sending the job definition for the task to an orchestration service; and generating, by the orchestration service, and execution schedule for each of the second plurality of actions. The execution schedule may be based on a table of dependencies for the second plurality of actions. The method/operations may also include causing each of the software applications to execute the corresponding second plurality of actions to together execute the task. Each of the plurality of code generation services may be further configured to generate one or more processes to be continuously executed by the corresponding software application. Each of the software applications may be an application that is not compatible with operation in the cloud environment. Each of the software applications may be encapsulated in a container that makes the software application executable in the cloud environment. Each of the containers may include an application programming interface (API), where the second plurality of actions are configured to be executed through the API. The software applications may include a data replicator process. The software applications may include a data integrator process. The top-level task may include a database replication task. The top-level task may include a database synchronization task. The method/operations may also include receiving a plurality of execution-specific parameters; and generating the second plurality of actions to bind the execution-specific parameters to the second plurality of actions.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments implemented as part of a Data Integration Platform Cloud (DIPC). In general, data integration involves combining data residing in different data sources and providing users with unified access and a unified view of the data. This process often arises and becomes significant in many situations, such as merging commercial entities with existing legacy databases. Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIPC to combine many heterogeneous data sources such that they can be presented in a unified view to the user.

The DIPC is a cloud-based platform for data transformation, integration, replication, and governance. It provides batch and real-time data movement between cloud and on-premises data sources while maintaining data consistency with default-tolerance and resiliency. The DIPC may be used to connect to various data sources and prepare, transform, replicate, govern, and/or monitored data from these various sources as they are combined into one or more data warehouses. The DIPC can work with any type of data source and support any type of data in any format. The DIPC can use a Platform as a Service (PaaS) or Infrastructure as a Service (IaaS) architecture to provide cloud-based data integration for an Enterprise.

The DIPC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery that maintains availability.

Figure 1:
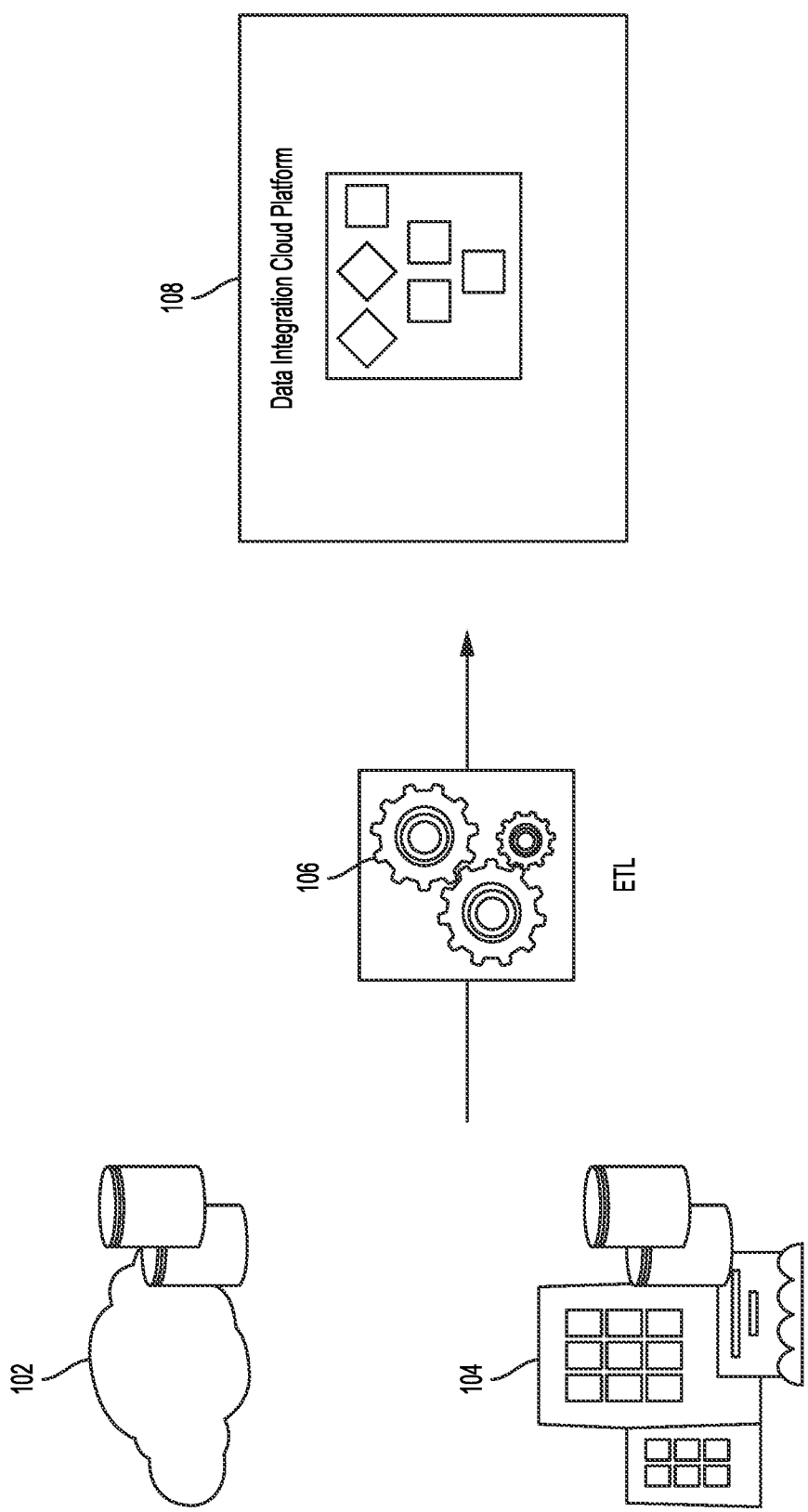
FIG. 1 illustrates a computer system architecture that utilizes the DIPC to integrate data from various existing platforms, according to some embodiments.

FIG. 1 illustrates a computer system architecture that utilizes the DIPC to integrate data from various existing platforms, according to some embodiments. A first data source 102 may include a cloud-based storage repository. A second data source 104 may include an on-premises data center. In order to provide uniform access and views to the first data source 102 and the second data source 104, the DIPC 108 can use an existing library of high-performance ELT functions 106 to copy data from the first data source 102 and the second data source 104. The DIPC 108 can also extract, enrich, and transform the data as it is stored in a new cloud platform. The DIPC 108 can then provide access to any big data utilities that are resident in or accessible by the cloud platform. In some embodiments, the original data sources 102, 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

Figure 2:
FIG. 2 illustrates one of the customized dashboards in a user interface that can be used to configure, monitor, and control a service instance in the DIPC.

FIG. 2 illustrates one of the customized dashboards in a user interface that can be used to configure, monitor, and control a service instance in the DIPC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIPC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
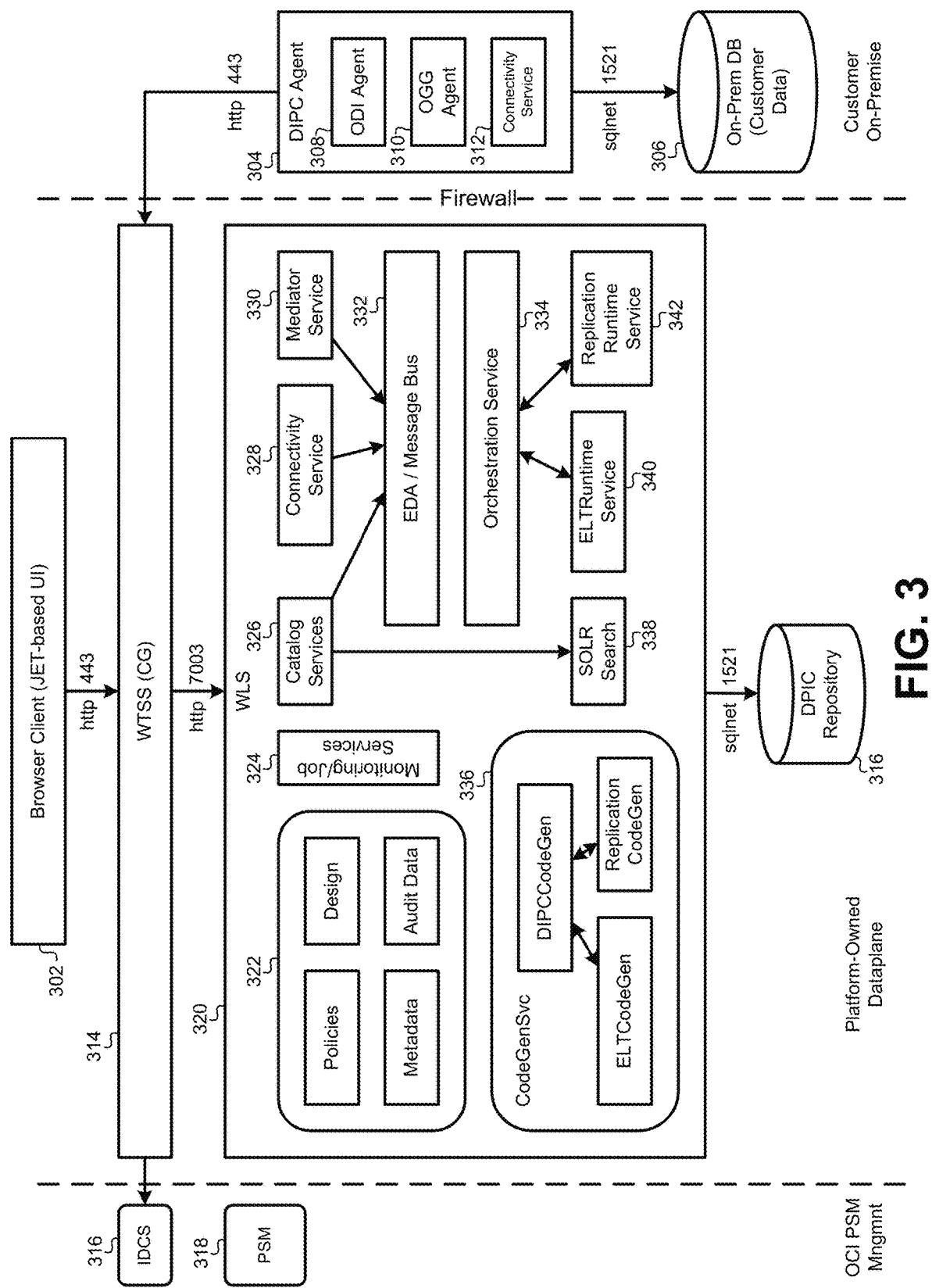
FIG. 3 illustrates an architectural diagram of the DIPC, according to some embodiments.

FIG. 3 illustrates an architectural diagram of the DIPC, according to some embodiments. Requests may be received through a browser client 302, which may be implemented using a JavaScript Extension Toolkit (JET) set of components. Alternatively or additionally, the system may receive requests through a DIPC agent 304 that operates at a customer's on-premises data center 306. The DIPC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIPC.

Incoming requests can be passed through a sign-in service 314, which may include load-balancing or other utilities for routing requests through the DIPC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIPC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIPC can be implemented on a Web logic server 320 for building and deploying enterprise applications in the cloud environment. The DIPC may include a local repository 322 that stores data policies, design information, metadata, and audit data for information passing through the DIPC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIPC. Information within the DIPC may be passed using an Event Driven Architecture (EDA) and a corresponding message bus 332.

The DIPC may also include an orchestration service 334. The orchestration service 334 may enable automation tasks by calling REST endpoints, scripts, third-party automation frameworks, and so forth. These tasks can then be executed by the orchestration service 334 to provide the DIPC functionality. The orchestration service 334 can use run-time services to import, transform, and store data. For example, an ELT runtime service 334 can execute the library of ELT functions described above, while the replication runtime service 342 can copy data from various data sources into a cloud-deployed DIPC repository 316. Additionally, the DIPC may include a code generation service 336 that provides automatic code generation for both ELT functions and replication functions.

Decoupled Push-Down Execution Generator

A decoupled push-down execution generator is a way to allow a software process to leverage other existing software processes using a set of generated scripts to allow a top-level execution engine to execute tasks in other software tools while remaining decoupled from the detailed knowledge about their processes or interfaces. The top-level tool defines a set of desired actions. For example, these actions may include replicating a database or an initial load of a database that can be generated by a top-level script generator. Then, a set of product-specific script generator plug-ins and a set of agent execution plug-ins may be implemented to generate and execute these actions.

A technical problem exists in the data integration domain. In data integration, there are many existing products that solve pieces of the overall data integration problem. However, many of these existing products are legacy products that are not designed to be exposed on the web, but rather were designed to be downloaded and installed in a customer system. These legacy products have very useful functionality that was not designed to be used in a Web-based cloud environment. Furthermore, software architects and customers desire to have one cloud-based umbrella product that solves the full integration problem for the user. This makes leveraging existing products extremely difficult, even though these existing products represent many man-years of effort in solving certain parts of the data integration problem. Prior to this disclosure, the data integration problem was solved by rebuilding products from the ground up to perform complete data integration jobs. For example, Microsoft Azure® is a product that fits this bottom-up model of redesign for a specific purpose.

The embodiments described herein solve this and other technical problems by leveraging existing data integration software processes and products and uses them as-is from a top-down cloud environment. This saves development time and allows the data integration process to use products that have a proven track record of success. Specifically, these embodiments represent a Web-based cloud product that generates codes or scripts that define a set of actions. Each action may be considered a mini-script that calls a piece of the functionality of an existing software process. These existing processes may be JAR-wrapped containers in the cloud environment with a REST API that allows the cloud environment to call pieces of their functionality as required.

The top-level product defines a set of desired actions. For example, these actions may include "replicate" or "initial load" that can be generated by a top-level script generator. Then, a set of product-specific script generator plug-ins and a set of agent execution plug-ins may be implemented. The top-level generator generates an ordered list of actions to be executed and passes the list of actions to each of the low-level plug-in script generators. The low-level generator plug-in determines which actions are targeted to itself, and generates a process definition object for each of those actions. The process definition object contains all of the interface scripts and information that the lower-level product needs to execute the action. The top-level execution engine then calls the appropriate low-level execution engine to execute each action using the detailed information that is present in the process object.

Figure 4:
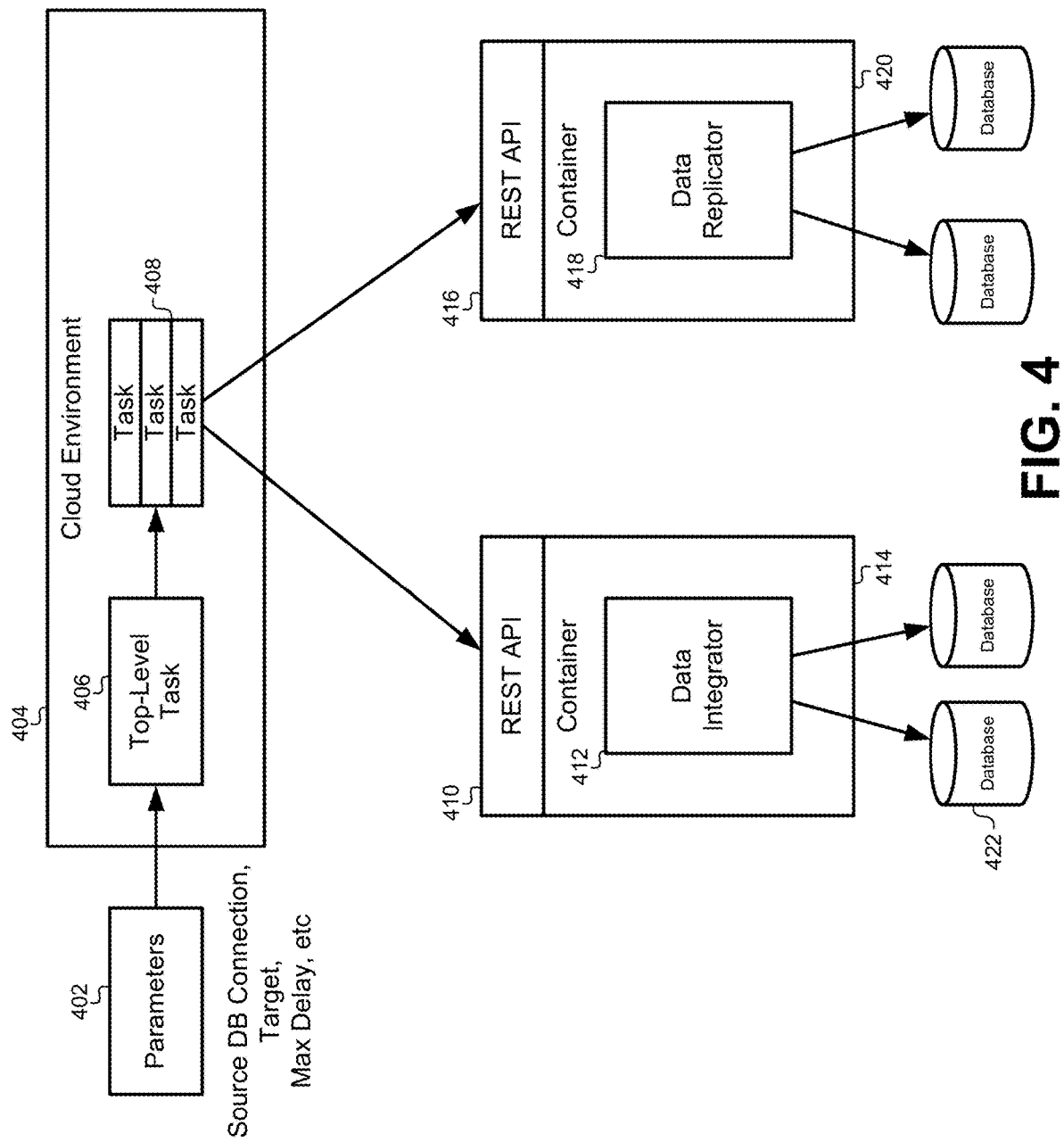
FIG. 4 illustrates a system diagram of a system configured to use legacy systems outside of a cloud environment to perform cloud-based operations, according to some embodiments.

FIG. 4 illustrates a system diagram 400 of a system configured to use legacy systems outside of a cloud environment to perform cloud-based operations, according to some embodiments. The system may include one or more legacy software tools that were designed and deployed prior to contemplating their use in a cloud environment. As such, these legacy software tools may not be designed to be operated over a network, over the Internet, or within the cloud environment 404. Instead, these legacy software tools may be designed such that they are downloaded and executed on a computer or workstation. These legacy software products may require installation and may use a user interface that is operated by a user. Therefore, they may not be designed to be interfaced with other software products in an automated fashion.

Many different types of software products and processes may be used in these embodiments. One example software product may include a comprehensive software package for real-time data integration and replication in heterogeneous IT environments. Referred to generically as a "data replicator," 418 this process may connect to a source database and replicate actions taken on that database on another location. Prior to this disclosure, this could be used in customer systems to synchronize two databases and provide uniformity during ongoing updates. When a data replicator 418 detects an operation on a source database, the data replicator 418 duplicates that action on a target database. For example, the data replicator 418 may detect operations by examining log files or listening for events that indicate data transactions have occurred on the database.

Another example of an existing type of software process that can be reused by these embodiments involves a "data integrator" 412. This may include a comprehensive data integration platform that covers most data integration requirements. Specifically, a data integrator can perform the initial transaction between a source database and a target database. The data integrator 412 may create mappings between diverse source tables, join data together, filter the data, and load the combined data into target systems. The data integrator 412 process is useful for creating an initial load/transfer, while the data replicator 418 is useful for maintaining synchronicity between the two databases.

The data integrator 412 and/or the data replicator 418 may be standalone applications as described above. To make their functionality available to an automated cloud environment 404, the data integrator 414 and/or the data replicator 420 may be encapsulated in a wrapper, such as a JAR wrapper or any other generic software container in a containerized environment. The container/wrapper 414, 420 may be configured to provide inputs and retrieve outputs from the applications 412, 418 and provide those inputs/outputs through an API 410, 416. For example, the container/wrapper 414, 420 may be configured to interact with the user interface of the data integrator 412 and/or the data replicator 418 to provide inputs as expected by these software applications. The data integrator 414 and/or data replicator 418 may be connected to source/target databases 422 and may perform their normal functionality in response to the inputs/outputs provided through the APIs 410, 416 on the source/target databases 422.

The data replicator and the data integrator are two processes that are used by way of example throughout this disclosure. However, other embodiments may use other software processes. Examples of other software processes may include a data quality process that performs error checking, data authentication, data validation, data verification, etc., on existing data. Another software process may include a runtime engine that performs DIPC queries. Because utilities within the DIPC include a container wrapper with a REST API, the runtime query process can query almost any system in the cloud environment. Although the data integrator 412 and the data replicator 418 are used as an example in this disclosure, not all embodiments are limited to these two types of applications. Any other type of legacy software application may be used by providing a container with an API that is accessible to the cloud environment 404.

In order to execute complex tasks that utilize legacy software tools such as the data integrator 412 and/or the data replicator 418, the cloud environment 404 may define one or more top-level tasks 406. These top-level tasks may be tasks such as "synchronize a database" or "migrate a database." These top-level tasks may be predefined such that the top-level task 406 may be selected from a plurality of predefined top-level tasks. These top-level task 406 may be executed by user or by another process in the cloud environment 404. The top-level task 406 may receive a set of parameters from a user or from another process. The parameters 402 may include information such as a source database connection, a target database connection, a maximum allowed delay, migration times, and/or any other parameter related to the specific top-level task 406. The top-level task 406 may then generate a set of tasks 408 that may be passed to the APIs 410, 416 to be executed by the legacy software applications 412, 418. This process is described in greater detail below.

Figure 5A:
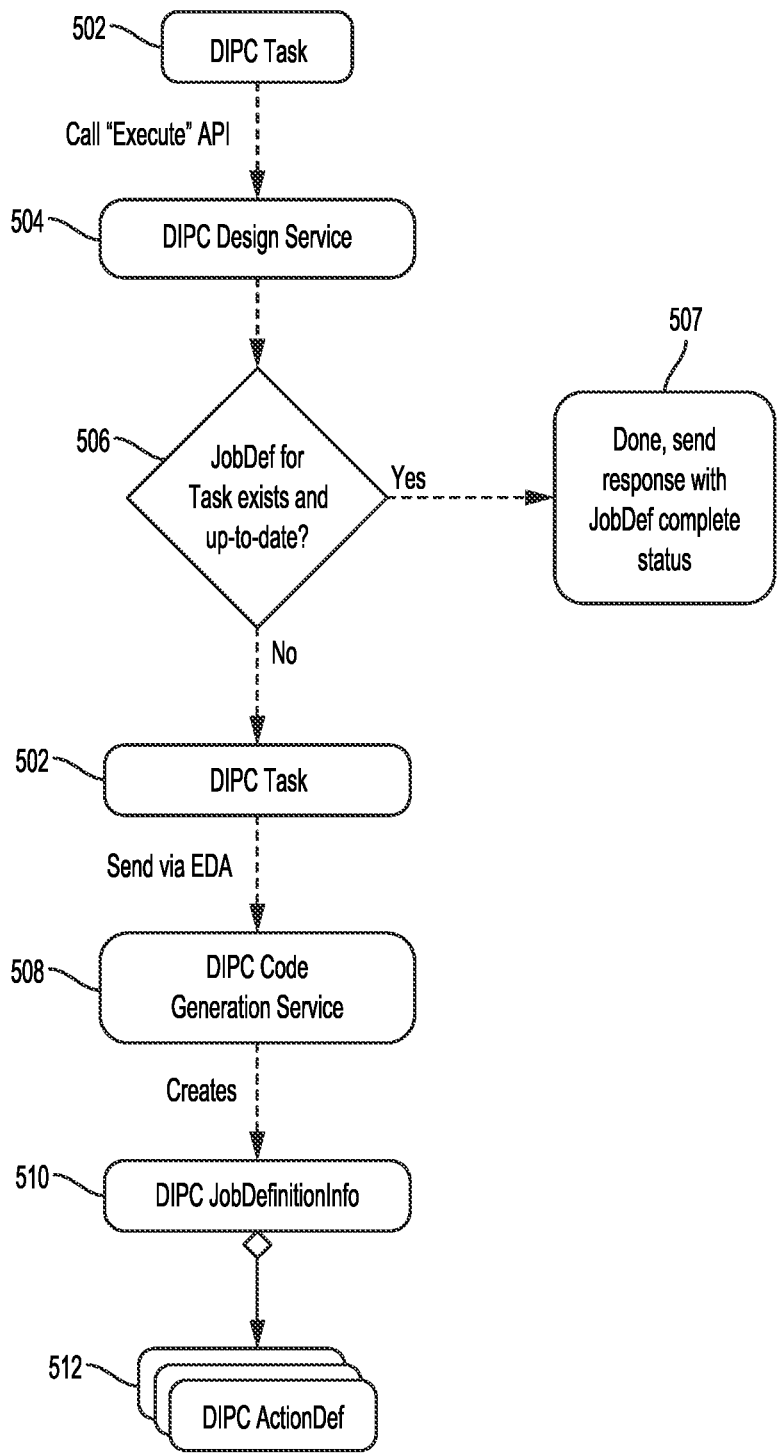
FIG. 5A illustrates a top-level process for automatically generating a script for performing a top-level task, according to some embodiments.

FIG. 5A illustrates a top-level process for automatically generating a script for performing a top-level task, according to some embodiments. The definition of the top-level task 502 may specify a top-level function. An example of a top-level task may be a high-level task that can be performed at the cloud environment level. For example, copying a database or synchronizing a database would be considered appropriate tasks for this level. The top-level task 502 may reference a job definition that defines the individual tasks 408 from FIG. 4 that can be executed in combination to perform the top-level task 502. This definition may be generated when the task is called, or may be reused if it already exists.

In some embodiments, this initial designation of a task 502 may be passed into a design service 504. The design service may be part of a microservice architecture within the cloud environment. Its primary function may be to determine whether code needs to be generated for the task 502, or whether existing code can be reused. If code for the task already exists and is up to date (506), then the existing code can be returned. For example, if the task 502 has been previously executed by the cloud environment, then any code generated (as described in detail below) may already exist in the cloud environment. If the job definition for the task already exists, then the design service 504 can determine that the corresponding code for performing the tasks already exists. In this case, the existing code may be executed to complete the top-level task 502, and a "Job-Done" response can be passed back to the calling entity. Otherwise, the design service 504 can pass the task 502 to a code generation service 508. At this stage, the task 502 may include a list of high-level tasks that can be implemented by one or more of the low-level services.

At this stage, the task 502 exists as a shell that can be filled in by parameters and code generated by the rest of the process as described below. Parameters may include parameters that are provided at runtime when the task is called by a system. For example, for the task to synchronize the database to be reusable, some parameters may need to be provided at runtime, such as the source database connection, the target database connection, parameters describing how the process should be executed, maximum delay times between each replication, target schema, source schema, and so forth. While these parameters can be populated at runtime, the remaining code can be generated by the code generation service 508, which generates a job definition 510 that can be populated by actions that are specific to each sub process used to complete the top-level task. The job definition 510 is designed to hold the generated "language" that is executed by the cloud environment runtime services. The job definition 510 may also include extra information, such as execution configuration and hints (e.g., a preference between data pump versus full transform data).

The code generation service 508 may be referred to as a top-level code generation service to distinguish it from the lower-level code generation services described below for each of the legacy applications. The task 502 may be thought of as the user-facing portion of the process that is selected by the user and populated with parameters as described above. From the user perspective, a task is selected and inputs are provided for performing the top-level task. The rest of the process for how that task is executed using the legacy software applications may be completely hidden from the user level, such that the user is not exposed to any of the job definition 510 with its associated actions for accomplishing the top-level task 502.

The code generation service 508 may identify a set of discrete tasks or "actions" that are used to accomplish the task. The code generation service may include predefined mappings of tasks to actions. For example, if the task 502 comprises migrating a database, the code generation service 508 may load a set of actions that defined steps for performing the migration, such as connecting to a source database, connecting to a target database, performing queries at the source database, and so forth. The resulting job definition 510 may include a plurality of actions 512. The scope of each of the actions 512 is such that each of the actions 512 may be completely executed by at least one of the legacy software applications.

Figure 5B:
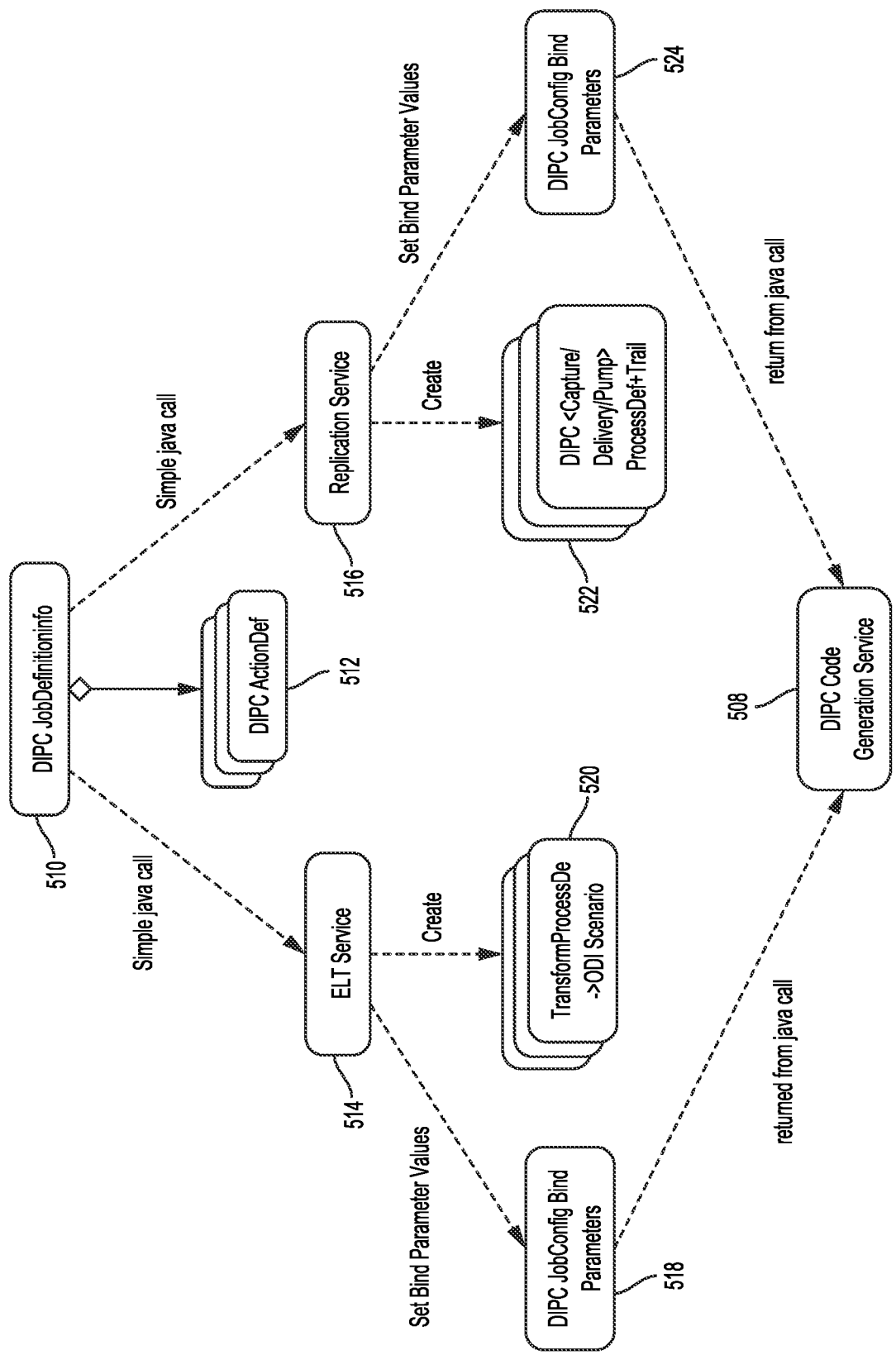
FIG. 5B illustrates a flowchart of a method for populating a job definition, according to some embodiments.

FIG. 5B illustrates a flowchart of a method for populating the actions 512 in a job definition 510, according to some embodiments. The process receives the job definition 510 from the method of FIG. 5A comprising the list of individuals actions 512. The job definition 510 may then be passed to each of the legacy software applications that can be used to execute the actions 512. For example, the list of actions 512 in the job definition 510 may be passed to lower-level code generation services 606, 608 to generate code for executing each of the actions 512. In contrast to the high-level code generation service 508 that generates the list of actions 512 for accomplishing the top-level task 502, the lower-level code generation services 514, 516 may generate code (i.e., lists of executable actions) that are actually executed by each of the legacy software applications to accomplish each of the actions 512. Note that this example uses only two legacy software applications, and thus only two lower-level code generation services 514, 516 are included in FIG. 5B. However, other tasks may use additional legacy software applications, and thus may include more lower-level code generation services.

The lower-level code generation service 514 for the data integrator software application described above may receive the list of actions 512 and determine which action in the list of actions 512 can be executed by the corresponding software application. This allows the job definition 510 to be sent to each of the lower-level code generation services 514, 516 without knowing any specific information about the code generation services. Instead, the top-level process can rely on the lower-level services 514, 516 to examine the list of actions 512, identify the actions that are applicable to the associated software application, and generate code for carrying out those actions.

For example, the lower-level code generation service 514 for the data integrator may receive the list of actions and identify a subset of the list of actions that can be executed by the data integrator. When received, these actions may be generic actions without any values bound in the action statements. The code generation service 514 can bind parameter values into the list of actions to create a parameterized action list 518 that can be executed by the associated data integrator. The code generation service 514 may also translate generic action statements from the job definition 510 into specific actions that may be executed through the API of the corresponding legacy software application. For example, one action may be to connect to a source database. The code generation service 514 can insert specific parameters and generate a command to connect to a specific source database at a particular address, through a particular report, using a particular adapter, and so forth, using a command defined by the API of the data integrator. The parameterized actions may be referred to a "second" actions to distinguish them from the "first" actions top-level code generation service 508.

In addition to the parameterized actions 518, the code generation service 514 may also generate a list of scenarios 520 that can be executed by the software application. These may be stored in a repository for the data integrator to be executed by the data integrator. Therefore, code generation may include parameterizing specific actions and generating scenarios to be executed on the source/target databases.

Similarly, the code generation service 516 for the data replicator may create a set of parameterized actions 524 that can be executed by the data replicator. Additionally, instead of generating scenarios 520 as described above for the data integrator, the code generation service 516 may instead generate a set of processes 522 to be executed by the data replicator. These processes may be executed by the data replicator and monitored going forward. Recall that the data replicator continuously monitors a source database and replicates transactions at the source database in a target database. Therefore, the code generation service 516 may generate processes 522 that are executed continuously to execute the top-level task. For example, a capture process may be specified in the processes 522 that monitors a source database. When a transaction is detected by the capture process, a delivery/pump process may receive an input that causes the transaction to be duplicated in the target database. These processes 522 may be executed in the legacy software application when the top-level task is executed, rather than being executed only a single time like the parameterized actions 524.

Parameter values can also be bound as described above in the parameterized actions 518, 524. For example, in a database replication job, the same actions may be performed each time the task is executed, but the parameters may change for each execution. Therefore, specific tasks can be created each time the task is executed. For example, source and destination targets may change with each execution. These parameter values can be bound and sent with the set of actions 518, 524 back to the code generation service 508. The flowchart in FIGS. 5A-5B is for a specific instance of the task being created where the user or calling process has provided these parameters for the job. It should also be noted that the code generation service 508 represents a top-level code generation service, and the code generation services 514, 516 represent low-level code generation services that implement the top-level instructions provided by the code generation service 508. It should also be noted that each of the low-level services 514, 516 may examine the full set of actions 512 required by the job definition 510. The low-level services 514, 516 then only need to select actions that are applicable to them, and implement those actions with a set of automatically generated scripts that bind parameters and execute these actions.

At this point, the code generation service 508 may receive the completed job definition with the actions 518, 524 and processes/scenarios 520, 522 populated in the job definition 510. The code generation service 508 can then store the job definition 510 in a repository that can be accessed in step 506 in FIG. 5A. In some embodiments, the code generation service 508 may then send a notification to any calling processes indicating that the job definition 510 is complete and ready to be executed for this particular topic-level task. This notification may be sent via, for example, an EDA bus.

Figure 6:
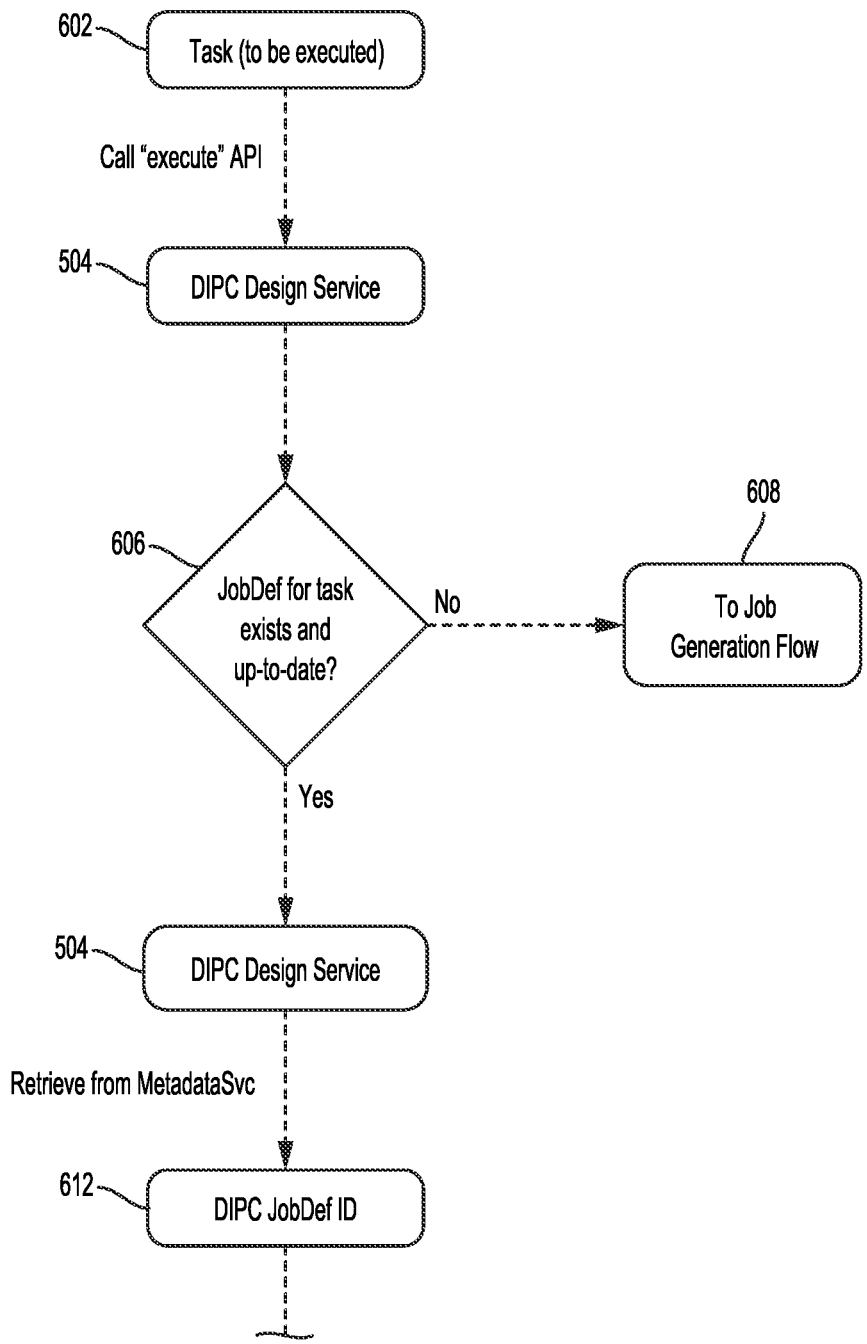
FIG. 6 illustrates a flowchart of a method for executing a top-level task as described in relation to FIGS. 4-5.

FIG. 6 illustrates a flowchart of a method for executing a top-level task as described above in relation to FIGS. 5A-5B. In some embodiments, the definition process described above can be separated from the execution process described below. In other embodiments, they may be combined such that tasks are generated on demand and executed immediately. For example, a user interface may be presented that allows a user to generate a task using one input, and executed task using another input (e.g., separate buttons). This allows users to generate tasks during one session and execute tasks in later sessions in the cloud environment. This also decouples the process for executing tasks from the process of generating tasks.

As described above, the cloud environment may receive a request for a task 602 to be executed. This task 602 can be passed to the design service 504, which then may determine whether the job definition for the task 602 has been created and whether the task is up-to-date. In FIG. 5A above, the design service 504 determined that the task was outdated or not yet created. Subsequently, the job definition generation flow was executed. In FIG. 6, if the job definition for the task 602 does not exist, then the generation flow 608 may be carried out as illustrated beginning in FIG. 5A and described in detail above. Alternatively, if the job definition does exist and is up-to-date (e.g., the job definition generation flow in FIGS. 5A-5B was executed successfully prior to the request for task 602), then the design service 504 can load the job definition 612 from the repository for the corresponding task 602.

In some embodiments, the flowchart of FIG. 6 may be carried out in response to a notification sent at the end of the flowchart in FIG. 5B indicating that the job definition is complete. For example, if the job definition for the task was not yet generated, the job definition may be generated as described above. When complete, the notification may cause the process in FIG. 6 to execute automatically. This may cause the process for generating the job definition to be hidden from the user. When the user selects the task 602 to be executed, the design service 504 may generate the job definition and then subsequently execute the job definition such that this is transparent to the user, and the cloud environment appears to simply execute the requested task 602.

The method may include receiving the complete test definition 602 to be executed at the design service 604. As a sanity check, the design service 604 can determine whether the task definition is up-to-date, which may only be an issue when the definition and execution processes are separated in time. Note that the execution begins in the design service 504 before being executed by a runtime service. Specifically, the design service can retrieve the job definition from a repository to be executed by the runtime service.

Figure 7:
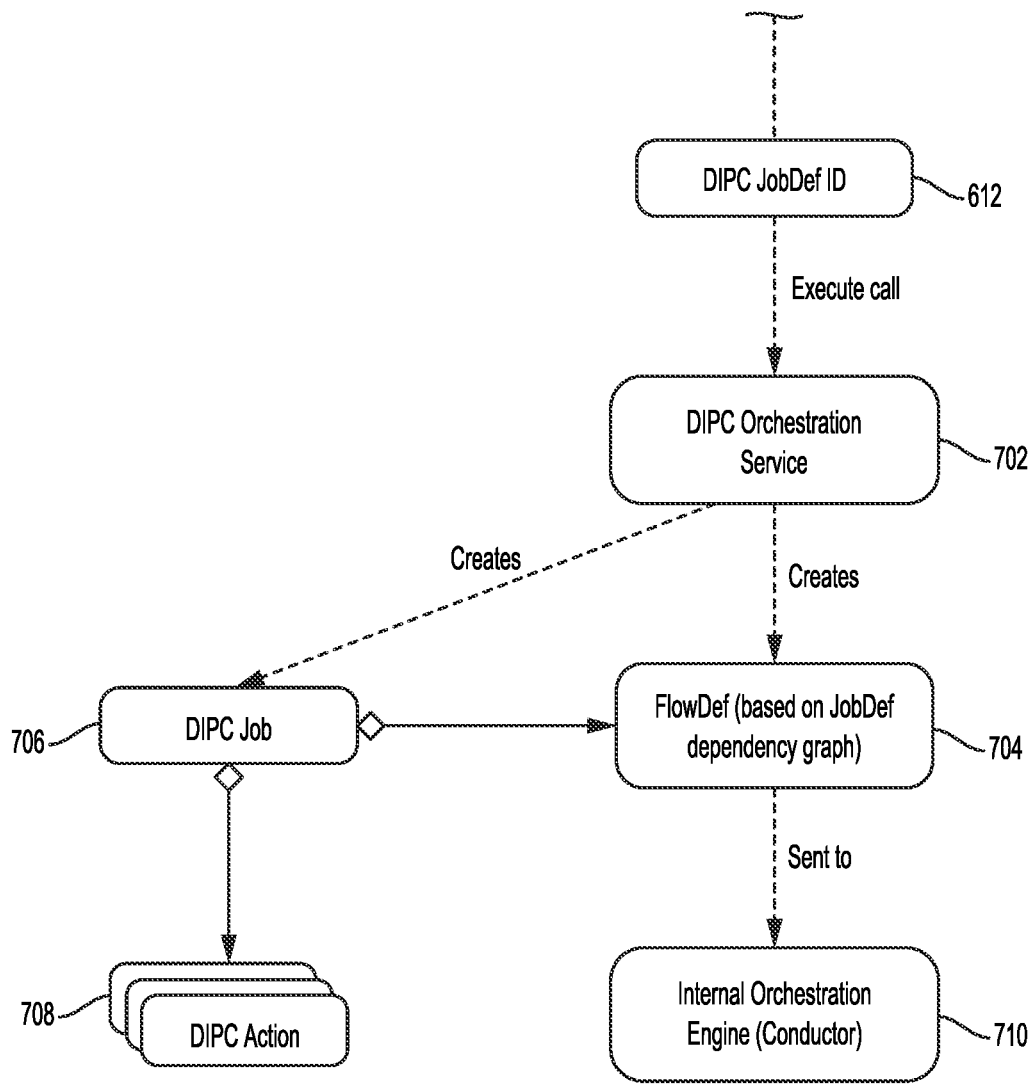
FIG. 7 illustrates a flowchart continuing the method for executing a top-level task, according to some embodiments.

FIG. 7 illustrates a flowchart continuing the method for executing a top-level task, according to some embodiments. The job definition may be comprised of a set of discrete tasks to be executed by existing container-wrapped processes in the cloud environment. Therefore, the job definition 612 can be passed to the orchestration service 702. The orchestration service 702 may be in charge of scheduling process calls and operations throughout the cloud environment. Therefore, the orchestration service 702 can examine the various tasks to be performed by different processes and determine an order of operation based on dependencies, availability, and so forth. The orchestration service 702 can then generate a flow definition graph 704 and a cloud environment job list 706 that includes a plurality of discrete cloud environment actions 708. The flow definition 704 can then cause each of the actions 708 to be executed by the internal orchestration engine 710 to complete the task.

Note that a single job definition may be executed multiple times, resulting in a plurality of jobs 706 that are coordinated by the orchestration service 702. For example, a task for replicating a database may be executed for a number of different databases. In this case, multiple requests for the same task may be received, each having a different parameter set. Each of these tasks may load the same job definition for replicating a database; however, the parameters for each of these tasks may be specific to different databases. The orchestration service 702 can then create a plurality of jobs 706, each of which includes a plurality of actions 708 that are coordinated by the orchestration service 702 for each database to be replicated.

Figure 8:
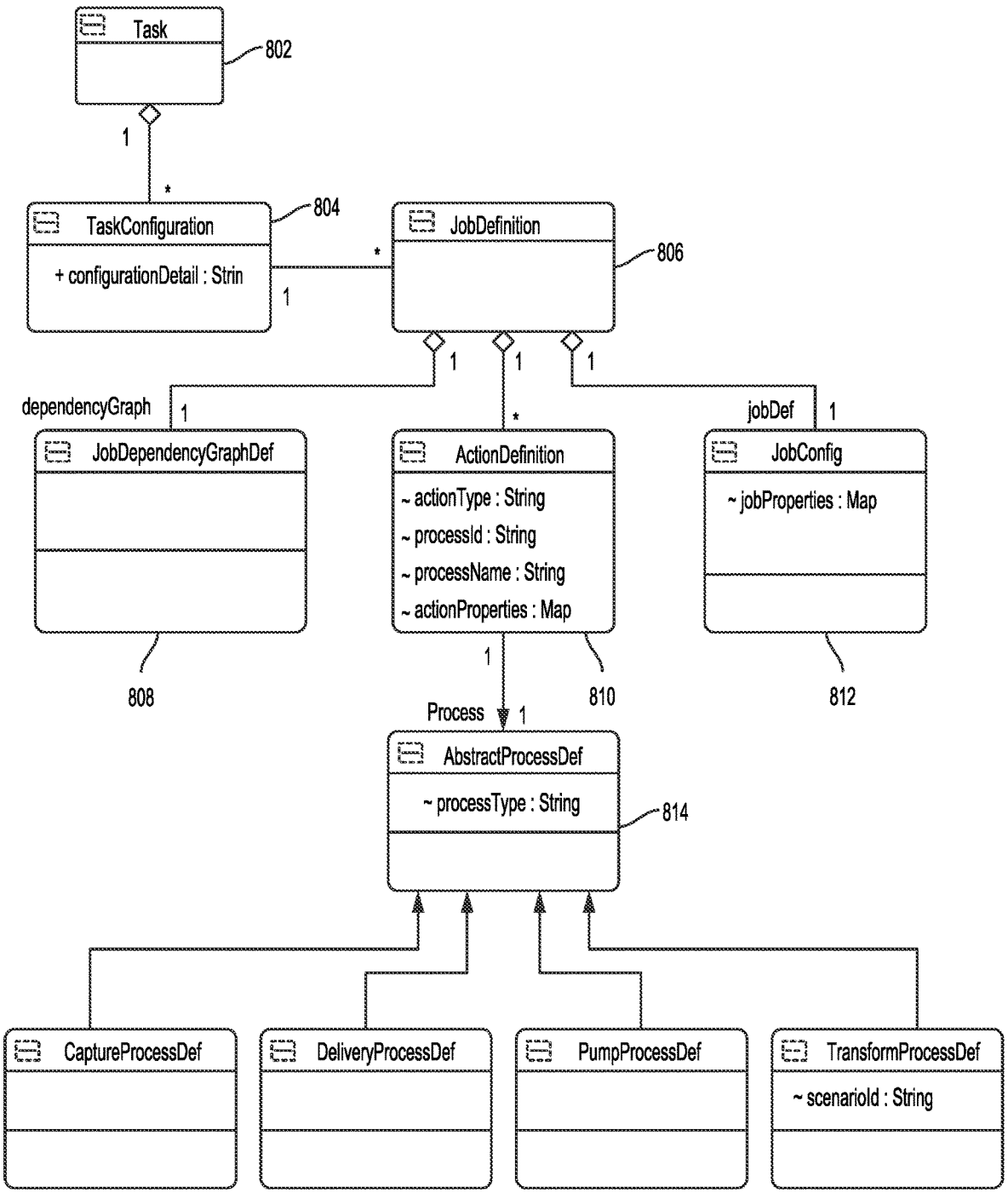
FIG. 8 illustrates a data model for the task being generated, according to some embodiments.

FIG. 8 illustrates a data model for the task being generated, according to some embodiments. The task 802 may be associated with a task configuration 804 that includes the parameters in execution specific details for the task. The task configuration 804 may represent a specific instance of the task 802 to be executed.

The task configuration 804 may also own a job definition 806. The job definition may be comprised of a plurality of actions 810, and each action may be associated with a specific process 814 to be executed by a lower-level service. As described above, the job definition may comprise a plurality of actions that are carried out by specific legacy software applications. Additionally, the actions may include a set of process definitions 814 that may be executed continuously by the legacy software applications as described above. For example, the capture process 820, the delivery process 822, and/or the pump process 824 may be used by the data replication application, while the transform process may be used by the data integration application.

The job definition 806 may also include a job configuration 812 that stores the job properties. Finally, the job definition 806 may include a dependency graph 808 that specifies dependencies between the lower-level processes and the actions to be executed as part of the job definition. The dependency graph may be used to specify an execution order of various actions using the known dependencies. For example, the dependency graph 808 may be used to order operations as described above by the orchestration service. The dependency graph 808 may be generated from a static table of known dependencies in the cloud environment.

Figure 9:
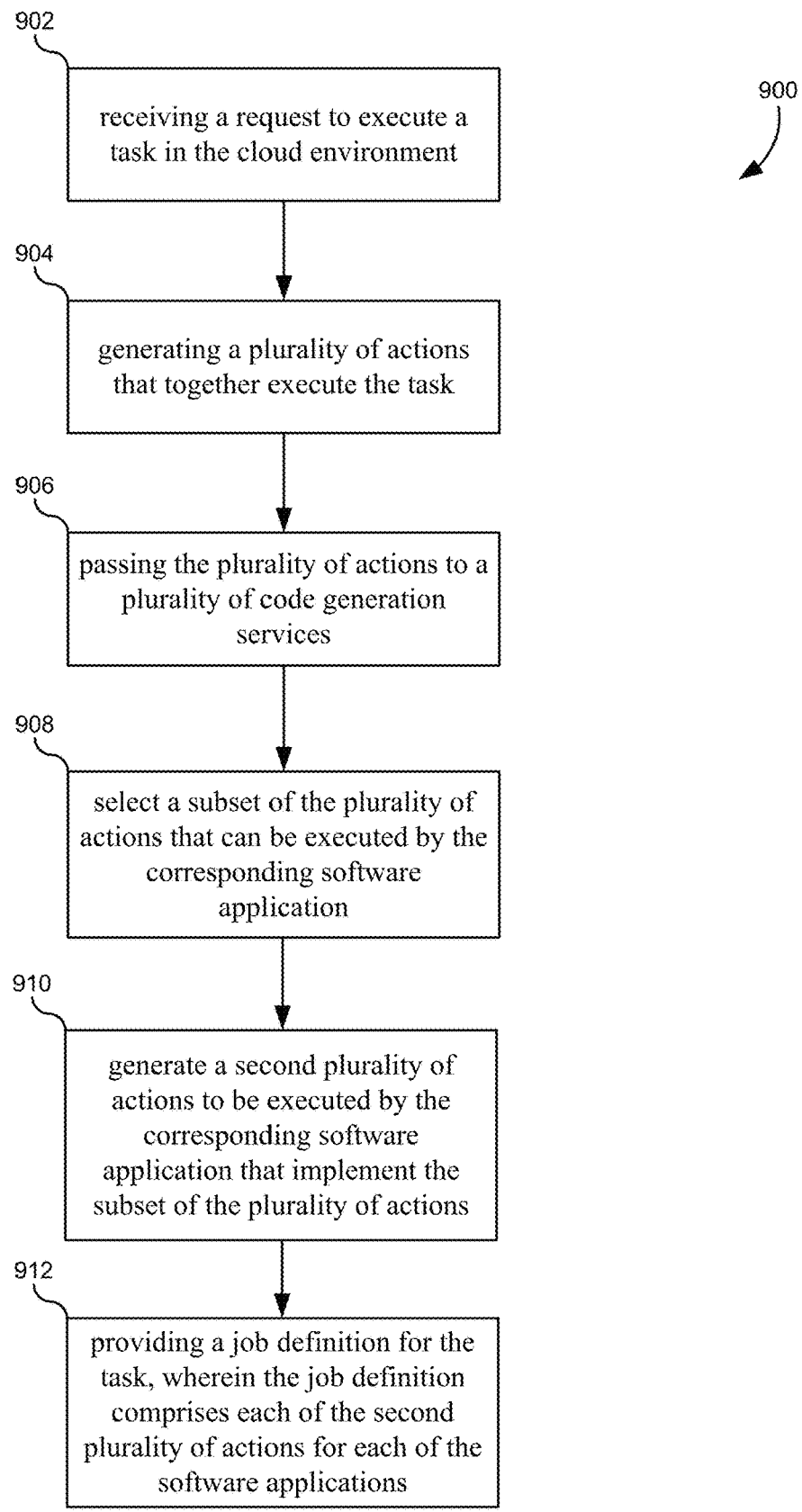
FIG. 9 illustrates a flowchart of a method for automatically generating a task to be executed by a plurality of lower-level processes, according to some embodiments.

FIG. 9 illustrates a flowchart of a method for marshalling existing software applications to automatically execute a task in a cloud environment, according to some embodiments. The method may include receiving a request to execute a task in the cloud environment (902). The task may be a top-level task requested by a user and/or process in the cloud environment. The method may also include generating a plurality of actions that together execute the task (904). The plurality of actions may be generated from a predefined list of actions for the task. The plurality of actions may be referred to as a "first plurality of actions." Each of the plurality of actions may be carried out by one or more software applications. In some embodiments, the software applications may be legacy software applications that are not designed for operation in a cloud environment. The plurality of actions may be generated by a code generation service. In some embodiments, the top-level task may be received with one or more parameters that are inserted into the plurality of actions to make the plurality of actions specific to this request of top-level task instead of being generic to all requests of the top-level task.

The method may additionally include passing the plurality of actions to a plurality of code generation services (906). Each of the code generation services may be associated with a specific software application. First, each code generation service may select a subset of the plurality of actions that can be executed by the associated software application (908). For example, the code generation service may examine the list of actions and identify actions that correspond to a mapping between actions and API functions for the associated software application.

Next, each code generation service may generate a second plurality of actions specific to the associated software application (910). These code generation services may translate the actions received from the top-level code generation service into specific commands for an API. Each of the software applications may be encapsulated in a wrapper or container that includes an API with commands to provide inputs and receive outputs from the software applications. The second plurality of applications may be parameterized with specific target/source information for each of these API commands. In some embodiments, the code generation services may also generate one or more processes and/or scenarios that are continuously executed by the corresponding software application.

The method may further include providing a job definition for the task (912). The job definition may include each of the sets of the second pluralities of actions from each of the code generation services. The job definition may represent a combination of each of these sets of actions that may be executed together to perform the top-level task.

Optionally, some embodiments may include receiving a command to send the job definition for the top-level task to the cloud environment for execution. The cloud environment may use an orchestration service to provide a schedule for executing each of the actions in the job definition. The orchestration service may determine dependencies between the actions, and order the actions accordingly. An execution schedule may be generated for each of the second plurality of actions, and the orchestration service may then use the execution schedule to call each of the software applications such that the top-level task is executed.

It should be appreciated that the specific steps illustrated in FIG. 9 provide particular methods of automatically generating a task to be executed by a plurality of lower-level processes according to various embodiments of the present invention. Other sequences of steps may also e performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
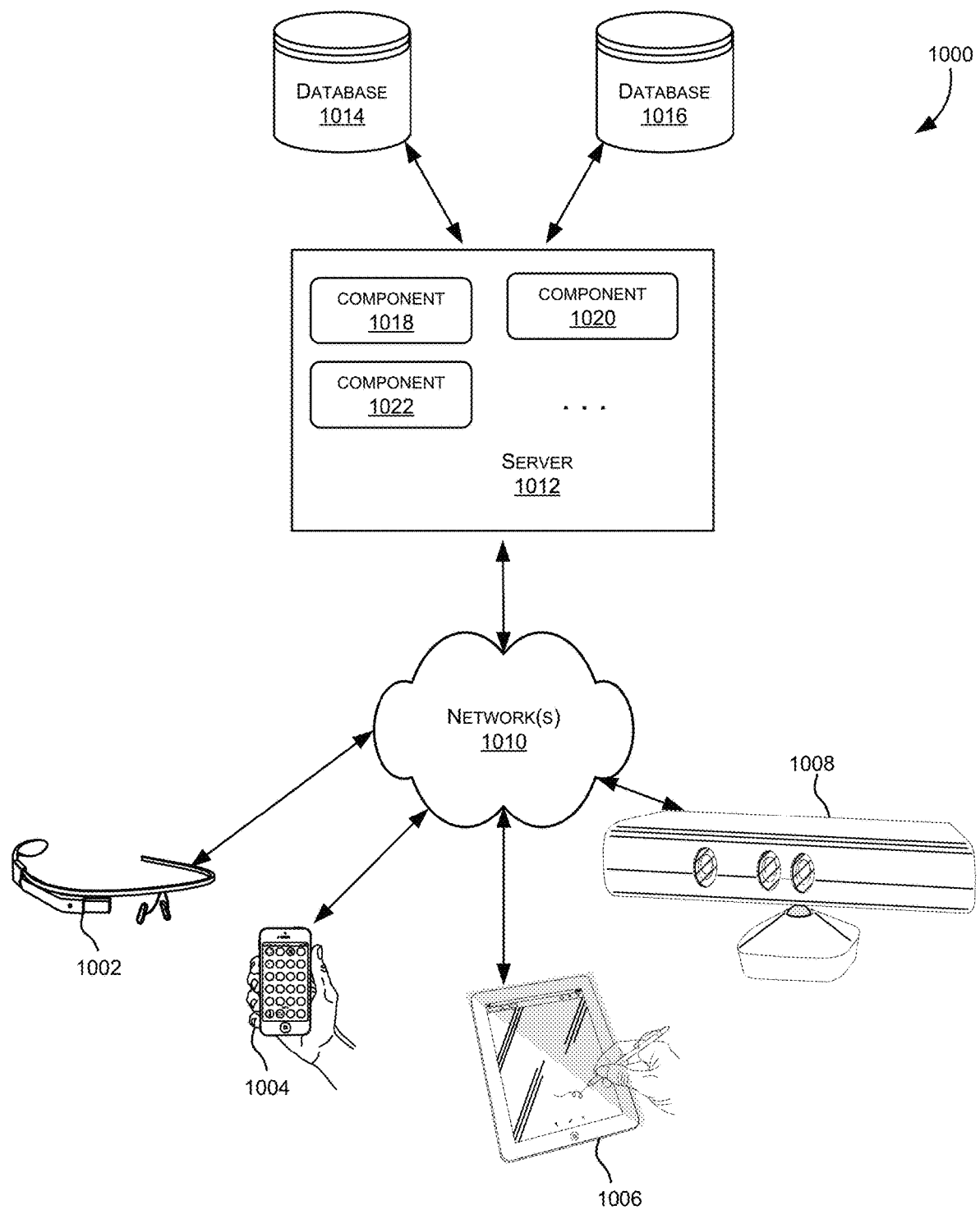
FIG. 10 illustrates a simplified block diagram of a distributed system for implementing some of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
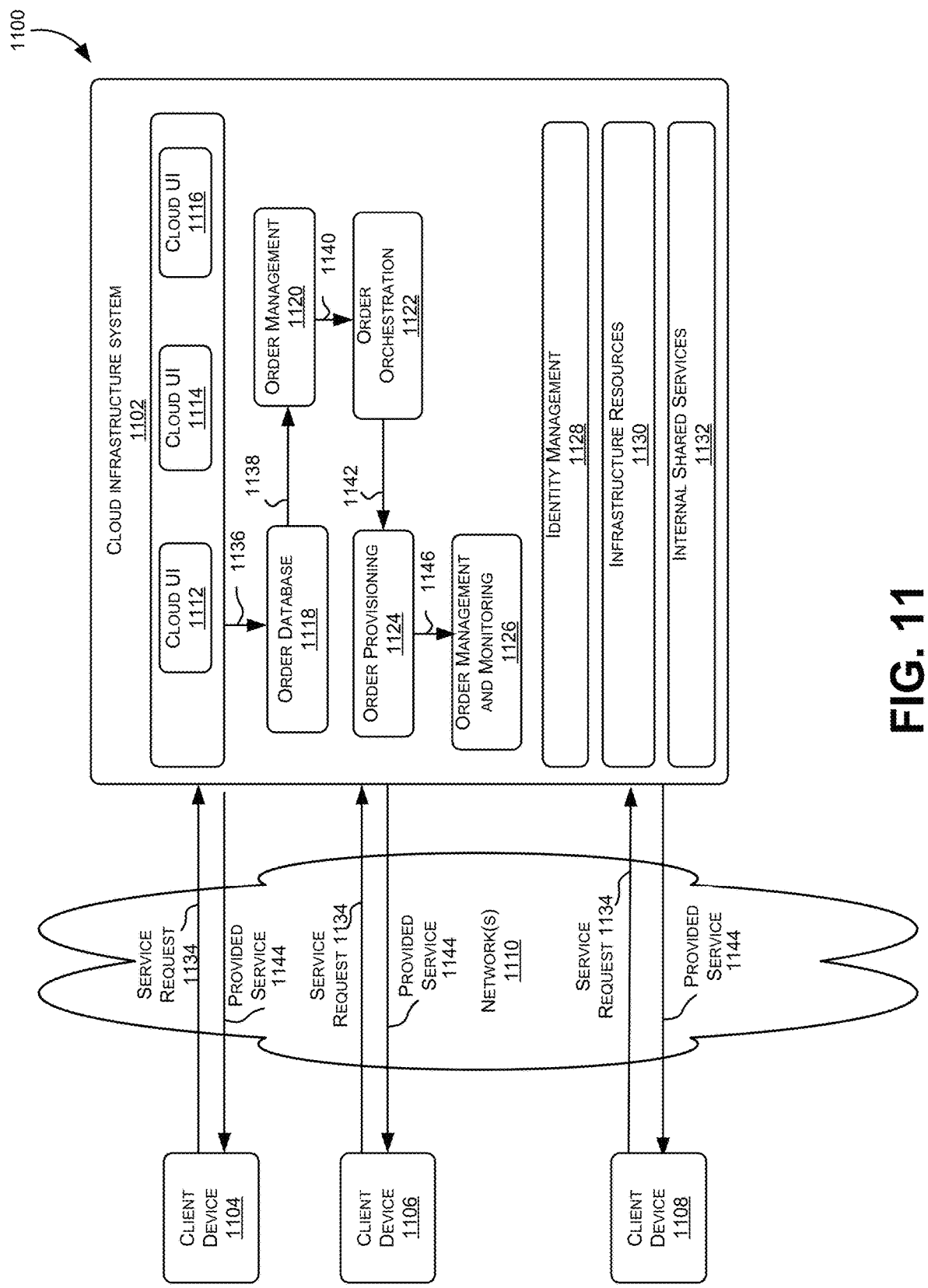
FIG. 11 illustrates a simplified block diagram of components of a system environment by which services provided by the components of an embodiment system may be offered as cloud services.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs.

The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
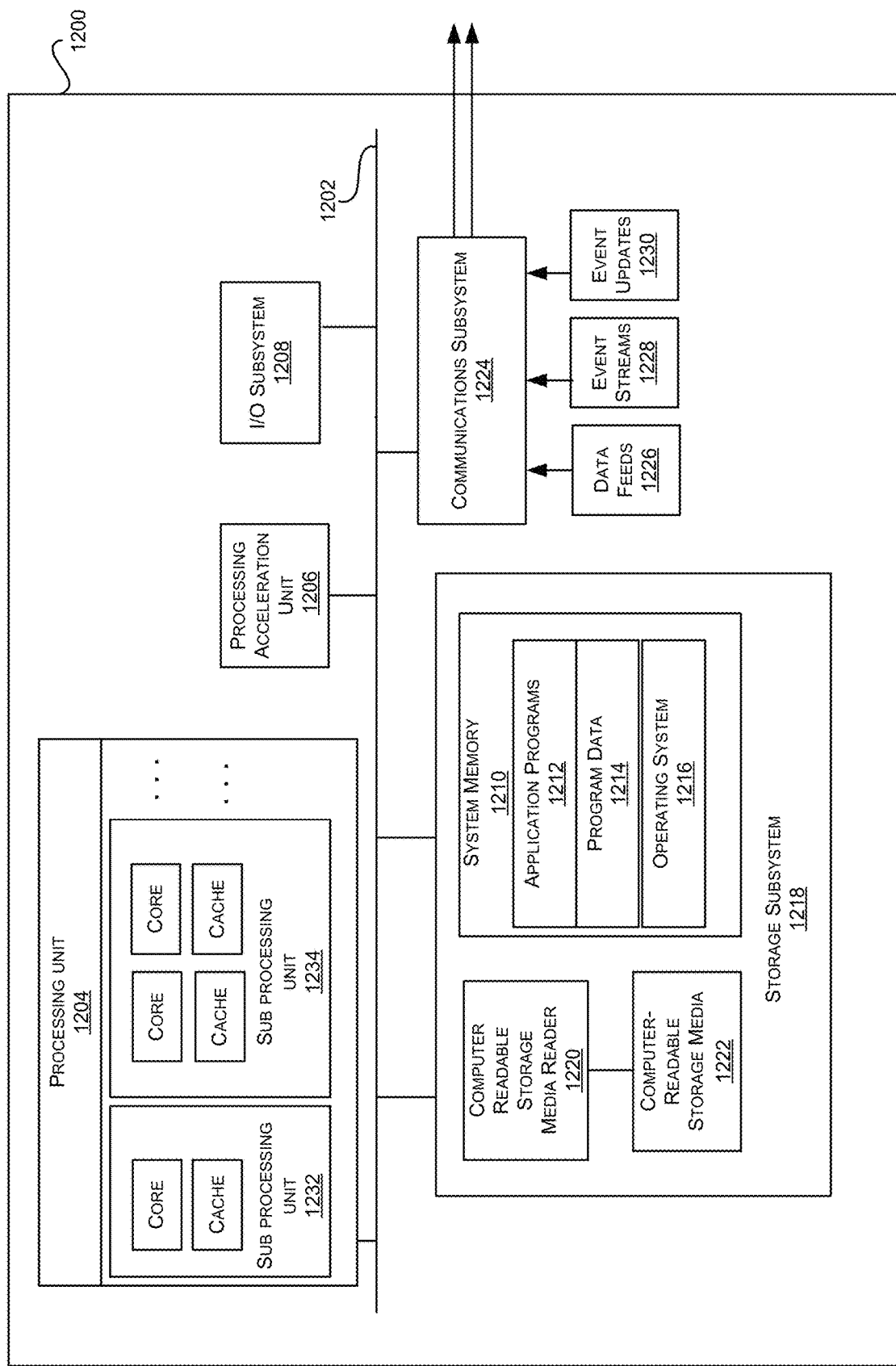
FIG. 12 illustrates an exemplary computer system, in which various embodiments may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of marshalling existing software applications to automatically execute a task in a cloud environment, the method comprising:
receiving a request to execute a task in the cloud environment;
in response to receiving the request, performing the following at the cloud environment:
generating a plurality of actions that together execute the task;
creating a job definition for the plurality of actions;
passing the plurality of actions to a plurality of code generation services, wherein each of the plurality of code generation services is associated with a corresponding software application in a plurality of software applications, and wherein each of the plurality of code generation services is configured to dynamically:
select a subset of the plurality of actions that can be executed by the corresponding software application;
generate a second plurality of actions to be executed by the corresponding software application that implement the subset of the plurality of actions;
add the second plurality of actions to the job definition; and
send the job definition to an orchestration service, wherein the job definition comprises each of the second plurality of actions for each of the software applications;
in response to receiving the job definition, performing the following at the orchestration service:
generating an execution schedule for each of the second plurality of actions;
passing the job definition to the plurality of software applications, wherein each of the plurality of software applications:
selects a subset of the second plurality of actions corresponding to the software application; and
executes the selected subset of the second plurality of actions in accordance with the execution schedule.

2. The method of claim 1, wherein the execution schedule is based on a table of dependencies for the second plurality of actions.

3. The method of claim 1, wherein each of the plurality of code generation services is further configured to:
generate one or more processes to be continuously executed by the corresponding software application.

4. The method of claim 1, wherein each of the software applications is an application that is not compatible with operation in the cloud environment.

5. The method of claim 4, wherein each of the software applications is encapsulated in a container that makes the software application executable in the cloud environment.

6. The method of claim 5, wherein each of the containers comprises an application programming interface (API), wherein the second plurality of actions are configured to be executed through the API.

7. The method of claim 1, wherein the software applications comprise a data replicator process.

8. The method of claim 1, wherein the software applications comprise a data integrator process.

9. The method of claim 1, wherein the task comprises a database replication task.

10. The method of claim 1, wherein the task comprises a database synchronization task.

11. The method of claim 1, further comprising:
receiving a plurality of execution-specific parameters; and
generating the second plurality of actions to bind the execution-specific parameters to the second plurality of actions.

12. A non-transitory computer-readable medium comprising instructions that, when executed by one or more processors, cause the one or more processors to perform operations comprising:
receiving a request to execute a task in a cloud environment;
in response to receiving the request, performing the following at the cloud environment:
generating a plurality of actions that together execute the task;
creating a job definition for the plurality of actions;
passing the plurality of actions to a plurality of code generation services, wherein each of the plurality of code generation services is associated with a corresponding software application in a plurality of software applications, and wherein each of the plurality of code generation services is configured to dynamically:
select a subset of the plurality of actions that can be executed by the corresponding software application;
generate a second plurality of actions to be executed by the corresponding software application that implement the subset of the plurality of actions;
add the second plurality of actions to the job definition; and
send the job definition to an orchestration service, wherein the job definition comprises each of the second plurality of actions for each of the software applications;
in response to receiving the job definition, performing the following at the orchestration service:
generating an execution schedule for each of the second plurality of actions;
passing the job definition to the plurality of software applications, wherein each of the plurality of software applications:
selects a subset of the second plurality of actions corresponding to the software application; and
executes the selected subset of the second plurality of actions in accordance with the execution schedule.

13. The non-transitory computer-readable medium of claim 12, wherein each of the plurality of code generation services is further configured to:
generate one or more processes to be continuously executed by the corresponding software application.

14. A system comprising:
one or more processors; and
one or more memory devices comprising instructions that, when executed by the one or more processors, cause the one or more processors to perform operations comprising:
receiving a request to execute a task in the cloud environment;
in response to receiving the request, performing the following at the cloud environment:
generating a plurality of actions that together execute the task;
creating a job definition for the plurality of actions;
passing the plurality of actions to a plurality of code generation services, wherein each of the plurality of code generation services is associated with a corresponding software application in a plurality of software applications, and wherein each of the plurality of code generation services is configured to dynamically:
select a subset of the plurality of actions that can be executed by the corresponding software application;
generate a second plurality of actions to be executed by the corresponding software application that implement the subset of the plurality of actions;
add the second plurality of actions to the job definition; and
send the job definition to an orchestration service, wherein the job definition comprises each of the second plurality of actions for each of the software applications;
in response to receiving the job definition, performing the following at the orchestration service:
generating an execution schedule for each of the second plurality of actions;
passing the job definition to the plurality of software applications, wherein each of the plurality of software applications:
selects a subset of the second plurality of actions corresponding to the software application; and
executes the selected subset of the second plurality of actions in accordance with the execution schedule.

15. The system of claim 14, wherein each of the plurality of code generation services is further configured to:
generate one or more processes to be continuously executed by the corresponding software application.

* * * * *